(12) United States Patent
Bajikar

(10) Patent No.: US 7,636,844 B2
(45) Date of Patent: *Dec. 22, 2009

(54) METHOD AND SYSTEM TO PROVIDE A TRUSTED CHANNEL WITHIN A COMPUTER SYSTEM FOR A SIM DEVICE

(75) Inventor: Sundeep M. Bajikar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 620 days.

This patent is subject to a terminal disclaimer.

(21) Appl. No.: 10/715,970

(22) Filed: Nov. 17, 2003

(65) Prior Publication Data

US 2005/0108532 A1    May 19, 2005

(51) Int. Cl.
*H04L 9/00*  (2006.01)

(52) U.S. Cl. .................. 713/171; 380/47; 380/227; 711/163; 711/164

(58) Field of Classification Search .......... 713/171; 455/410, 411, 558; 380/47, 227
See application file for complete search history.

(56) References Cited

U.S. PATENT DOCUMENTS

| | | | |
|---|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,571,672 A | 2/1986 | Hatada et al. |

(Continued)

FOREIGN PATENT DOCUMENTS

DE    4217444    12/1992

(Continued)

OTHER PUBLICATIONS

Berg, Cliff, "How Do I Create a Signed Applet?", Dr. Dobb's Journal, (Aug. 1997), pp. 1-9.

(Continued)

*Primary Examiner*—Kimyen Vu
*Assistant Examiner*—April Y Shan
(74) *Attorney, Agent, or Firm*—Blakely, Sokoloff, Taylor & Zafman LLP

(57) ABSTRACT

Exchanging data between a SIM device and an application executed in a trusted platform, wherein the data to be exchanged is secured from unauthorized access. In one embodiment, the exchanging data includes exchanging an encryption key via a trusted path within a computer system, and exchanging data encrypted with the encryption key, via an untrusted path with the computer system.

23 Claims, 2 Drawing Sheets

U.S. PATENT DOCUMENTS

Figure 1:
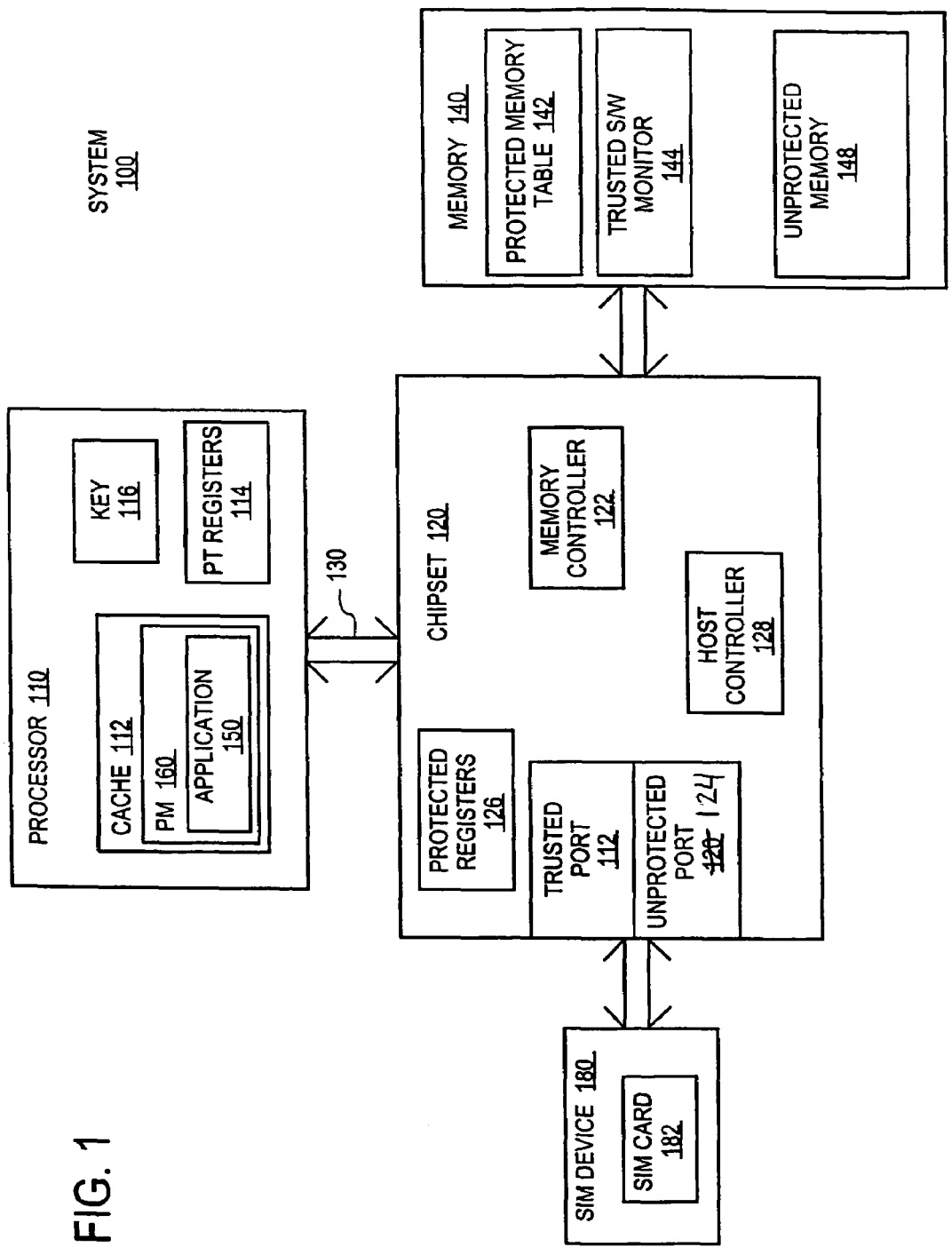

| | | |
|---|---|---|
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,210,795 A | 5/1993 | Lipner et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,515,440 A | 5/1996 | Mooney et al. |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle et al. |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,953,502 A | 9/1999 | Helbig, Sr. |
| 5,956,408 A | 9/1999 | Arnold |
| 5,970,147 A | 10/1999 | Davis |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Insley |
| 6,148,379 A | 11/2000 | Schimmel |
| 6,158,546 A | 12/2000 | Hanson et al. |
| 6,169,890 B1 * | 1/2001 | Vatanen ..................... 455/406 |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,233,683 B1 | 5/2001 | Chan et al. |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne et al. |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 * | 10/2001 | Guthery ........................ 726/9 |
| 6,314,409 B2 | 11/2001 | Schneck et al. |
| 6,317,834 B1 | 11/2001 | Gennaro et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |

| | | |
|---|---|---|
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,408,388 B1 | 6/2002 | Fischer |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,591,364 B1 | 7/2003 | Patel |
| 6,609,199 B1 * | 8/2003 | DeTreville .................. 713/172 |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 6,779,112 B1 * | 8/2004 | Guthery ...................... 713/172 |
| 6,792,536 B1 | 9/2004 | Teppler |
| 6,895,507 B1 | 5/2005 | Teppler |
| 6,898,709 B1 | 5/2005 | Teppler |
| 6,907,264 B1 | 6/2005 | Sterkel |
| 6,907,530 B2 | 6/2005 | Wang |
| 6,928,299 B1 * | 8/2005 | Rinne et al. .................. 455/555 |
| 6,948,069 B1 | 9/2005 | Teppler |
| 6,990,579 B1 | 1/2006 | Herbert et al. |
| 6,993,656 B1 | 1/2006 | Peyravian et al. |
| 6,996,710 B1 * | 2/2006 | Ellison et al. ............... 713/156 |
| 7,055,041 B1 * | 5/2006 | Hansmann et al. .......... 713/169 |
| 7,079,649 B1 | 7/2006 | Bramhill et al. |
| 7,093,127 B2 * | 8/2006 | McNulty et al. ............. 713/168 |
| 7,096,494 B1 * | 8/2006 | Chen .............................. 726/9 |
| 7,146,504 B2 | 12/2006 | Parks et al. |
| 7,146,516 B2 | 12/2006 | Dhupar et al. |
| 7,317,798 B2 | 1/2008 | Saito |
| 7,358,777 B2 | 4/2008 | Lehto |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0012433 A1 | 1/2002 | Haverinen et al. |
| 2002/0023032 A1 | 2/2002 | Pearson et al. |
| 2002/0034302 A1 | 3/2002 | Moriai et al. |
| 2002/0054625 A1 | 5/2002 | Matsumoto et al. |
| 2002/0147916 A1 | 10/2002 | Strongin et al. |
| 2002/0164026 A1 | 11/2002 | Huima |
| 2002/0166061 A1 | 11/2002 | Falik et al. |
| 2002/0169717 A1 | 11/2002 | Challener |
| 2003/0018892 A1 | 1/2003 | Tello |
| 2003/0046542 A1 | 3/2003 | Chen et al. |
| 2003/0046589 A1 | 3/2003 | Gregg |
| 2003/0051041 A1 | 3/2003 | Kalavade et al. |
| 2003/0074548 A1 | 4/2003 | Cromer et al. |
| 2003/0110372 A1 | 6/2003 | Proudler |
| 2003/0112977 A1 | 6/2003 | Ray et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0166397 A1 | 9/2003 | Aura |
| 2003/0188179 A1 | 10/2003 | Challener et al. |
| 2003/0196084 A1 | 10/2003 | Okereke et al. |
| 2003/0196085 A1 | 10/2003 | Lampson et al. |
| 2004/0005051 A1 | 1/2004 | Wheeler et al. |
| 2004/0073796 A1 | 4/2004 | Kang et al. |
| 2004/0077335 A1 | 4/2004 | Lee et al. |
| 2004/0078571 A1 | 4/2004 | Haverinen |
| 2004/0083366 A1 * | 4/2004 | Nachenberg et al. ........ 713/170 |
| 2004/0117539 A1 | 6/2004 | Bennett et al. |
| 2004/0117623 A1 * | 6/2004 | Kalogridis et al. .......... 713/165 |
| 2004/0128528 A1 | 7/2004 | Poisner |
| 2004/0128549 A1 | 7/2004 | Poisner |
| 2004/0139320 A1 | 7/2004 | Shinohara |
| 2004/0143730 A1 * | 7/2004 | Wen et al. ................... 713/150 |
| 2004/0158716 A1 * | 8/2004 | Turtiainen et al. .......... 713/172 |
| 2004/0172542 A1 * | 9/2004 | Minemura ................... 713/176 |
| 2004/0176071 A1 * | 9/2004 | Gehrmann et al. ........... 455/411 |
| 2004/0196978 A1 | 10/2004 | Godfrey et al. |
| 2004/0218762 A1 * | 11/2004 | Le Saint et al. ............. 380/277 |
| 2004/0221174 A1 * | 11/2004 | Le Saint et al. ............. 713/201 |
| 2004/0268143 A1 | 12/2004 | Poisner |
| 2005/0025091 A1 | 2/2005 | Patel et al. |
| 2005/0033987 A1 | 2/2005 | Yan et al. |
| 2005/0039013 A1 | 2/2005 | Bajikar et al. |
| 2005/0060568 A1 | 3/2005 | Beresnevichiene et al. |
| 2005/0108171 A1 | 5/2005 | Bajikar et al. |
| 2005/0108534 A1 | 5/2005 | Bajikar et al. |
| 2005/0198506 A1 | 9/2005 | Qi et al. |
| 2005/0228993 A1 | 10/2005 | Silvester et al. |
| 2006/0179305 A1 | 8/2006 | Zhang |
| 2006/0193297 A1 | 8/2006 | Zhang et al. |

FOREIGN PATENT DOCUMENTS

| | | |
|---|---|---|
| DE | 10004164 A1 | 8/2001 |
| EP | 0 473 913 A2 | 3/1992 |
| EP | 0 600 112 A1 | 6/1994 |
| EP | 0 892 521 A2 | 1/1999 |
| EP | 0 930 567 A3 | 7/1999 |
| EP | 0 961 193 A2 | 12/1999 |
| EP | 0 965 902 A2 | 12/1999 |
| EP | 1 022 640 A2 | 7/2000 |
| EP | 1 030 237 A1 | 8/2000 |
| EP | 1 055 989 A1 | 11/2000 |
| EP | 1 056 014 A1 | 11/2000 |
| EP | 1 085 396 A1 | 3/2001 |
| EP | 1 146 715 A1 | 10/2001 |
| EP | 1 271 277 A2 | 1/2003 |
| EP | 1 355 216 A2 | 10/2003 |
| JP | 2000076139 | 3/2000 |
| WO | WO 95/24696 A2 | 9/1995 |
| WO | WO 97/29567 A1 | 8/1997 |
| WO | WO 98/12620 A1 | 3/1998 |
| WO | WO 98/34365 A1 | 8/1998 |
| WO | WO 98/44402 A1 | 10/1998 |
| WO | WO 99/05600 A2 | 2/1999 |
| WO | WO 99/09482 A1 | 2/1999 |
| WO | WO 99/18511 A1 | 4/1999 |
| WO | WO 99/57863 A1 | 11/1999 |
| WO | WO 99/65579 A1 | 12/1999 |
| WO | WO 00/21238 A1 | 4/2000 |
| WO | WO 00/62232 A1 | 10/2000 |
| WO | WO 01/13198 | 2/2001 |
| WO | WO 01/27723 A1 | 4/2001 |
| WO | WO 01/27821 A2 | 4/2001 |
| WO | WO 01/63994 A2 | 8/2001 |
| WO | WO 01/75564 A2 | 10/2001 |
| WO | WO 01/75565 A2 | 10/2001 |
| WO | WO 01/75595 A2 | 10/2001 |
| WO | WO 02/01794 A2 | 1/2002 |
| WO | WO 02/03208 A2 | 1/2002 |
| WO | WO 02/17555 A2 | 2/2002 |
| WO | WO 02/41597 A2 | 5/2002 |
| WO | WO 02/060121 A1 | 8/2002 |
| WO | WO 02/086684 A2 | 10/2002 |

| | | |
|---|---|---|
| WO | WO 03/058412 A2 | 7/2003 |
| WO | WO 2005/050423 A1 | 6/2005 |

OTHER PUBLICATIONS

Brands, Stefan, "Restrictive Blinding of Secret-Key Certificates", Springer-Verlag XP002201306, (1995),Chapter 3.
Chien, Andrew A., et al., "Safe and Protected Execution for the Morph/AMRM Reconfigurable Processor", 7th Annual IEEE Symposium, FCCM '99 Proceedings, XP010359180, ISBN 0-7695-0375-6, Los Alamitos, CA, (Apr. 21, 1999), pp. 209-221.
Compaq Computer Corporation, et al., "Trusted Computing Platform Alliance (TCPA) Main Specification Version 1.1a", (Dec, 2001), pp. 1-321.
Coulouris, G. et al., "Distributed Systems: Concepts and Design", $2^{nd}$ Edition, Addison-Wesley Publishers Ltd., Essex, England, pp. 422-424 (1994).
Crawford, J., "Architecture of the Intel 80386", Proceedings of the IEEE International Conference on Computer Design: VLSI in Computers (ICCD '86), ISBN 0-8186-0735-1, pp. 155-160 (Oct. 6-9, 1986).
Davida, George I., et al., "Defending Systems Against Viruses through Cryptographic Authentication", Proceedings of the Symposium on Security and Privacy, IEEE Comp. Soc. Press, ISBN 0-8186-1939-2, (May 1989).
Fabry, R.S., "Capability-Based Addressing", Communications of the ACM, vol. 17, No. 7, pp. 403-412 (Jul. 1974).
Frieder, G., "The Architecture and Operational Characteristics of the VMX Host Machine", IEEE Proceedings of the 15th Annual Workshop on Microprogramming, pp. 9-16, (Oct. 5, 1982).
Goldberg, Robert P., "Survey of Virtual Machine Research", Computer Magazine, (Jun. 1974), pp. 34-35.
Gong, Li, et al., "Going Behond the Sandbox: An Overview of the New Security Architecture in the Java Development Kit 1.2", Proceedings of the USENIX Symposium on Internet Technologies and Systems, Monterey, CA, (Dec. 1997).
Gum, P. H., "System/370 Extended Architecture: Facilities for Virtual Machines", IBM J. Research Development, vol. 27, No. 6, (Nov. 1983), pp. 530-544.
Heinrich, Joe, "MIPS R4000 Microprocessor User's Manual, Second Edition", Chapter 4 "Memory Management", (Jun. 11, 1993), pp. 61-97.
Hewlett Packard Company, "Mobile Security Overview", pp. 1-9, (Sep. 2002).
IBM, "Information Display Technique for a Terminate Stay Resident Program IBM Technical Disclosure Bulletin", TDB-ACC-No. NA9112156, vol. 34, Issue 7A, (Dec. 1, 1991), pp. 156-158.
IBM Corporation, "IBM ThinkPad T30 Notebooks", IBM Product Specification, located at www-1.ibm.com/services/files/cisco_130_spec_sheet_070202.pdf, pp. 1-6 (Jul. 2, 2002).
Intel Corporation, "Intel 82802AB/82802AC Firmware Hub (FWH)", Intel Product Datasheet, Document No. 290658-004, pp. 1-6, 17-28 (Nov. 2000).
Intel Corporation, "IA-64 System Abstraction Layer Specification", Intel Product Specification, Order No. 245359-001, 112 pages, Jan. 2000.
Intel Corporation, "Intel IA-64 Architecture Software Developer's Manual—vol 2: IA-64 System Architecture", Intel Product Manual, Order No. 245318-001, pp. i, ii, 5.1-5.3, 11.1-11.8, 11.23-11.26, Jan. 2000.
Intel Corporation, "IA-32 Intel Architecture Software Developer's Manual—vol. 3: System Programming Guide", (2003) pp. 13-1 to 13-24.
Intel Corporation, "Intel386 DX Microprocessor 32-Bit CHMOS Microprocessor With Integrated Memory Management", (1995), pp. 5-56.
Karger, Paul A., et al., "A VMM Security Kernal for the VAX Architecture", Proceedings of the Symposium on Research in Security and Privacy, XP010020182, ISBN 0-8186-2060-9, Boxborough, MA, (May 7, 1990), pp. 2-19.
Kashiwagi, Kazuhiko , et al., "Design and Implementation of Dynamically Reconstructing System Software", Software Engineering Conference, Proceedings 1996 Asia-Pacific Seoul, South Korea Dec. 4-7, 1996, Los Alamitos, CA USA, IEEE Comput. Soc, US, ISBN 0-8186-7638-8, (1996).
Lawton, Kevin , et al., "Running Multiple Operating Systems Concurrently on an IA32 PC Using Virtualization Techniques", http://www.plex86.org/research/paper.txt, (Nov. 29, 1999), pp. 1-31.
Luke, Jahn , et al., "Replacement Strategy for Aging Avionics Computers", IEEE AES Systems Magazine, XP002190614, (Mar. 1999).
Menezes, Alfred J., et al., "Handbook of Applied Cryptography", CRC Press Series on Discrete Mathematics and its Applications, Boca Raton, FL, ISBN 0849385237, pp. 403-405, 475, 506-515, 570 (Oct. 1996).
Motorola, "M68040 User's Manual", (1993), pp. 1-1 to 8-32.
Nanba, S. et al., "VM/4: ACOS-4 Virtual Machine Architecture", IEEE Proceedings of the 12th Annual Symposium on Computer Architecture, pp. 171-178 (Jun. 1985).
Richt, Stefan , et al., "In-Circuit-Emulator Wird Echtzeittauglich", Elektronic, Franzis Verlag GMBH, Muchen, DE, vol. 40, No. 16, XP000259620, (Aug. 6, 1991), pp. 100-103.
Robin, John S., et al., "Analysis of the Pentium's Ability to Support a Secure Virtual Machine Monitor", Proceedings of the 9th USENIX Security Symposium, XP002247347, Denver, Colorado, (Aug. 14, 2000), pp. 1-17.
Rosenblum, M. , "Virtual Platform: A Virtual Machine Monitor for Commodity PC", Proceedings of the 11th Hotchips Conference, (Aug. 17, 1999), pp. 185-196.
RSA Security Inc., "Hardware Authenticators", located at www.rsasecurity.com/node.asp?id=1158, pp. 1-2 (2004).
RSA Security Inc., "Software Authenticators", located at www.rsasecurity.com/node.asp?id=1313, pp. 1-2 (2004).
RSA Security Inc., "RSA SecurID Authenticators", located at www.rsasecurity.com/products/securid/datasheets/SID_DS_0103.pdf, pp. 1-2 (2003).
Saez, Sergio , et al., "A Hardware Scheduler for Complex Real-Time Systems", Proceedings of the IEEE International Symposium on Industrial Electronics, XP002190615,(Jul. 1999), pp. 43-48.
Schneier, B., "Applied Cryptography: Protocols, Algorithm, and Source Code in C", $2^{nd}$ Edition, Wiley, John & Sons, Inc., ISBN 0471117099 (hardcover printing), pp. 47-52, 56-65, 169-187 (Oct. 1995).
Schneier, B., "Applied Cryptography: Protocols, Algorithm, and Source Code in C", $2^{nd}$ Edition, Wiley, John & Sons, Inc., ISBN 0471128457 (softcover printing), pp. 28-33, 176-177, 216-217, 461-473, 518-522 (Nov. 1995).
Sherwood, Timothy , et al., "Patchable Instruction ROM Architecture", Department of Computer Science and Engineering, University of California, San Diego, La Jolla, CA, (Nov. 2001).
Dashevsky, Jane et al., *SIM Trust Parameters: Mobile Service Technologies*, Rev. 1.5, located at http://cache-www.intel.com/cd/00/00/04/07/40705_sim.pdf, 64 pages, Jan. 2003.
Intel Corporation, *LaGrande Technology Architectural Overview*, Document No. 252491-001, located at http://www.intel.com/technology/security/downloads/LT_Arch_Overview.pdf, 10 pages, Sep. 2003.
European Patent Office, International Search Report and Written Opinion for International Application No. PCT/US2004/037485, 16 pages, Apr. 8, 2005.
Trusted Computing Platform Alliance, Main Specification version 1.1b, Feb. 2002.
Mills, D., "Simple Network Time Protocol (SNTP) Version 4 for IPv4, IPv6 and OSI." Network Working Group, University of Delaware, Oct. 1996.
PCT Int'l. Preliminary Search Report and Written Opinion for PCT/US2004/036832, mailing date Jun. 1, 2006, (8 pages).
U.S. Appl. No. 10/977,158, Office Action dated Sep. 08, 2008, 8 pages.
Drews, S. "Standardisierung USB für Smart Cards", Internet Citation, Feb. 2, 2004, 11 pages, XP002317401, http://www.sit.fraunhofer.de/german/SICA/sica_projects/smartcard-ws/>.
Intel Corporation Office Action for U.S. Appl. No. 10/718,103 (P17642) mailed Dec. 15, 2006.
Intel Corporation Office Action for U.S. Appl. No. 10/718,103 (P17642) mailed Mar. 22, 2007.

Intel Corporation Office Action for U.S. Appl. No. 10/744,120 (P17643) mailed Dec. 4, 2006.
Intel Corporation Office Action for U.S. Appl. No. 10/744,120 (P17643) mailed Jun. 22, 2007.
Intel Corporation Office Action for U.S. Appl. No. 10/744,120 (P17643) mailed Jan. 8, 2008.
Intel Corporation Office Action for U.S. Appl. No. 10/744,120 (P17643) mailed Jul. 10, 2008.
Intel Corporation Office Action for U.S. Appl. No. 10/718,369 (P17644) mailed Jul. 5, 2007.
Intel Corporation Office Action for U.S. Appl. No. 10/718,369 (P17644) mailed Jan. 25, 2008.
Intel Corporation Office Action for U.S. Appl. No. 10/718,369 (P17644) mailed Jul. 23, 2008.
Intel Corporation Office Action for U.S. Appl. No. 10/718,369 (P17644) mailed Jan. 23, 2009.
Intel Corporation Office Action for U.S. Appl. No. 10/881,658 (P18589) mailed Oct. 5, 2007.
Intel Corporation Office Action for U.S. Appl. No. 10/977,158 (P20343) mailed Feb. 10, 2009.
PCT International Search Report and Written Opinion for International Application No. PCT/US2004/036832, mailed Mar. 1, 2005, 14 pages.

\* cited by examiner

METHOD AND SYSTEM TO PROVIDE A TRUSTED CHANNEL WITHIN A COMPUTER SYSTEM FOR A SIM DEVICE

CROSS REFERENCE TO RELATED APPLICATIONS

This application is related to the following co-pending U.S. patent applications: 1) U.S. patent application Ser. No. 10/718,103 entitled, "Method and Apparatus for Implementing Subscriber Identity Module (SIM) Capabilities in an Open Platform," assigned to the assignee of the present invention and filed Nov. 19, 2003; 2) U.S. patent application Ser. No. 10/744,120 entitled, "A Method and Apparatus for Providing a Trusted Time Stamp in an Open Platform", assigned to the assignee of the present invention and filed Dec. 22, 2003; 3) U.S. patent application Ser. No. 10/718,369 entitled "Providing Services to an Open Platform Implementing Subscriber Identity Module (SIM) Capabilities," assigned to the assignee of the present invention and filed Nov. 19, 2003; and 4) U.S. patent application Ser. No. 10/881,658 entitled "System Including a Wireless Wide Area Network (WWAN) Module with an External Identity Module Reader and Approach for Certifying the WWAN Module," assigned to the assignee of the present application and filed Jun. 29, 2004.

FIELD OF INVENTION

The field of invention relates generally to trusted computer platforms; and, more specifically, to a method and apparatus to provide a trusted channel within a computer system for a SIM device.

BACKGROUND

Trusted operating systems (OS) and platforms are a relatively new concept. In first generation platforms, a trusted environment is created where applications can run trustedly and tamper-free. The security is created through changes in the processor, chipset, and software to create an environment that cannot be seen by other applications (memory regions are protected) and cannot be tampered with (code execution flow cannot be altered). As a result, the computer system cannot be illegally accessed by anyone or compromised by viruses.

In today's computing age, Subscriber Identify Modules (SIM), sometimes referred to as a smart card, are becoming more prevalent. A SIM is a credit card sized card that is typically used for Global System for Mobile communications (GSM) phones to store telephone account information and provide Authentication, Authorization and Accounting (AAA). The SIM cards also allow a user to use a borrowed or rented GSM phone as if it were their own. SIM cards can also be programmed to display custom menus on the phone's readout. In some cases, the SIM cards include a built-in microprocessor and memory that may be used in some cases for identification or financial transactions. When inserted into a reader, the SIM is accessible to transfer data to and from the SIM.

When using a SIM card in a computer system, there is a need to securely access information from the SIM card in order to prevent accesses to the SIM from unauthorized software applications. Such accesses may be intended to learn certain SIM secrets or to break GSM authentication mechanisms and steal services provided.

FIGURES

Figure 2:
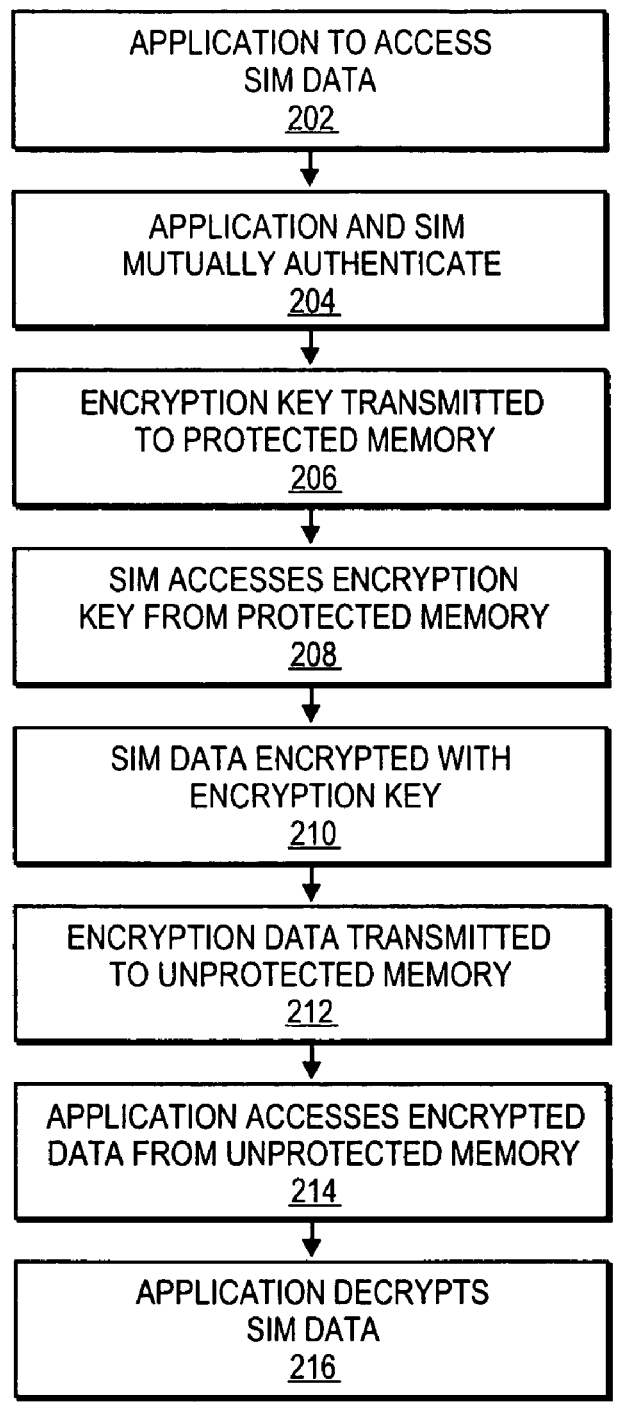

One or more embodiments are illustrated by way of example, and not limitation, in the Figures of the accompanying drawings, in which FIG. 1 illustrates a computer system capable of providing a trusted platform to protect selected applications and data from unauthorized access, according to one embodiment; and FIG. 2 is a flow diagram describing a process of providing a trusted channel within a computer system for a SIM device, according to one embodiment.

DETAILED DESCRIPTION

A method and system to provide a trusted channel within a computer system for a SIM device is described. In one embodiment, data is exchanged between an application being executed in a trusted platform and a SIM device, wherein the data exchanged is protected from unauthorized access. In one embodiment, an encryption key is exchanged via a trusted channel within a computer system. Data encrypted with the encryption key is exchanged via an untrusted channel within the computer system.

In the following description, numerous specific details are set forth. However, it is understood that embodiments may be practiced without these specific details. In other instances, well-known circuits, structures and techniques have not been shown in detail in order not to obscure the understanding of this description.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In addition, as described herein, a trusted platform, components, units, or subunits thereof, are interchangeably referenced as protected or secured.

Trusted Platform

FIG. 1 illustrates a computer system, according to one embodiment, capable of providing a trusted platform to protect selected applications and data from unauthorized access. System 100 of the illustrated embodiment includes a processors 110, a chipset 120 connected to processors 110 via processor bus 130, a memory 140, and a SIM device 180 to access data on a SIM card 182. In alternative embodiments, additional processors and units may be included.

Processor 110 may have various elements, which may include but are not limited to, embedded key 116, page table (PT) registers 114 and cache memory (cache) 112. All or part of cache 112 may include, or be convertible to, private memory (PM) 160. Private memory is a memory with sufficient protections to prevent access to it by any unauthorized device (e.g., any device other than the associated processor 110) while activated as a private memory.

Key 116 may be an embedded key to be used for encryption, decryption, and/or validation of various blocks of data and/or code. Alternatively, the key 116 may be provided on an alternative unit within system 100. PT registers 114 may be a table in the form of registers to identify which memory pages are to be accessible only by trusted code and which memory pages are not to be so protected.

In one embodiment, the memory 140 may include system memory for system 100, and in one embodiment may be implemented as volatile memory commonly referred to as random access memory (RAM). In one embodiment, the memory 140 may contain a protected memory table 142, which defines which memory blocks (where a memory block is a range of contiguously addressable memory locations) in memory 140 are to be inaccessible to direct memory access (DMA) transfers. Since all accesses to memory 140 go through chipset 120, chipset 120 may check protected memory table 142 before permitting any DMA transfer to take place. In a particular operation, the memory blocks protected from DMA transfers by protected memory table 142 may be the same memory blocks restricted to protected processing by PT registers 114 in processor 110. The protected memory table 142 may alternatively be stored in a memory device of an alternative unit within system 100.

In one embodiment, Memory 140 also includes trusted software (SNV) monitor 144, which may monitor and control the overall trusted operating environment once the trusted operating environment has been established. In one embodiment, the trusted S/N monitor 144 may be located in memory blocks that are protected from DMA transfers by the protected memory table 142.

Chipset 120 may be a logic circuit to provide an interface between processors 110, memory 140, SIM device 180, and other devices not shown. In one embodiment, chipset 120 is implemented as one or more individual integrated circuits, but in other embodiments, chipset 120 may be implemented as a portion of a larger integrated circuit. Chipset 120 may include memory controller 122 to control accesses to memory 140. In addition, in one embodiment, the chipset 120 may have a SIM reader of the SIM device integrated on the chipset 120.

In one embodiment, protected registers 126 are writable only by commands that may only be initiated by trusted microcode in processors 110. Trusted microcode is microcode whose execution may only be initiated by authorized instruction(s) and/or by hardware that is not controllable by unauthorized devices. In one embodiment, trusted registers 126 hold data that identifies the locations of, and/or controls access to, trusted memory table 142 and trusted S/W monitor 144. In one embodiment, trusted registers 126 include a register to enable or disable the use of trusted memory table 142 so that the DMA protections may be activated before entering a trusted operating environment and deactivated after leaving the trusted operating environment.

Trusted Channel with SIM Device

FIG. 2 is a flow diagram describing a process of providing a trusted channel within a computer system for a SIM device, according to one embodiment. As described herein, reference to a SIM device includes other types of related Smart cards. The processes described in the flow diagram of FIG. 2, are described with reference to the system of FIG. 1, described above.

In one embodiment, in process 202, an application 150 being executed in a trusted environment of the system 100, determines information is to be accessed from a SIM device 180 of the system 100. The application 150 being executed in a trusted atmosphere can be located in a protected memory, such as protected memory 160 of cache 112, or a protected section of memory 140. In one embodiment, the SIM device 180 includes a mechanism to ascertain that the accesses are coming from the application in a trusted environment that is running on the same platform that the SIM device is physically attached to, and not from some remotely executing application.

In process 204, the application and the SIM device perform a mutual authentication to determine that the SIM device is the correct device from which the application is to receive data, or that the application is the correct application to which the SIM device is to send the data. The mutual authentication may be conducted via a variety of processes known throughout the concerned field of technology.

In process 206, following the completion of the mutual authentication, in one embodiment, the application 150 transmits an encryption key to a protected section of memory 140, via a trusted channel with the memory device, and corresponding PT entries held in the processor. In one embodiment, the protected section of memory to store the encryption key is identifiable via the protected memory table 142.

The encryption key provided by the application 150 to the protected section of memory 140, is generated by the application 150, and is applicable to one of several available encryption processes, such as the Data Encryption Standard (DAS) or the Advanced Encryption Standard (AES). In one embodiment, the encryption key is generated via utilization of the key 116 of processor 110.

In process 208, the SIM device 180 accesses the encryption key from the protected section of memory 140. In one embodiment, the SIM device accesses the encryption key via a trusted port 112, of a chipset 120, which is mapped to the protected section of memory 140. In one embodiment, the trusted port may support one of several platform bus protocols, including USB. In an alternative embodiment, the encryption key is provided by the SIM device, wherein the application accesses the encryption key from the SIM device via the trusted port of the chipset.

In process 210, the SIM device 180 uses the encryption key to encrypt data to be sent to the application 150. In process 212, the encrypted packets are transferred from the SIM device 180 by a host controller 128 (e.g., a USB host controller) of the chipset to a regular area of memory (i.e., unprotected section of memory 148). For example, an area of memory that is used to store data packets, such as USB data packets.

In one embodiment, the encrypted packets are transmitted to the memory by the host controller via a regular port 124 of the chipset (i.e., an unprotected port), which maps to an unprotected section of memory 148. In one embodiment, the encrypted packets from the SIM device include Message Authentication Code (MAC) to provide a level of integrity protection.

In process 214, a driver (e.g., an unprotected USB driver) accesses the encrypted packets from the unprotected section of memory 148 and provides the encrypted packets to the application 150 being executed in the trusted environment. In process 216, the application 150 decrypts the encrypted packets to access the data from the SIM device, which have been securely transferred to the application via an untrusted path within the system 100.

In one embodiment, new encryption keys may be exchanged based on predetermined events. For example, a new encryption key may be exchanged following one of, or a combination of, each new transaction (as defined based on implementation choice), the passage of a predetermined period of time, or the exchange of a predetermined amount of data.

In another alternative embodiment, multiple encryption keys are exchanged between the application 150 and the SIM device 180, to be used for encrypted data exchanges between the SIM device 180 and the application 150.

For example, a SIM device may include multiple data pipes (e.g., bulk-in, bulk-out, and default control pipes). For each of the data pipes of the SIM device, a separate encryption key may be used to protect the data exchanges. Alternatively, the separate data pipes may all use the same encryption key.

In an alternative embodiment, the data packets may be transmitted from the SIM device to the application without the use of encryption. For example, the host controller 128 transmits the data from the SIM device to the protected section of memory 140 via the trusted port 112 of the chipset 120. A trusted driver would then access the data from the protected section of memory 140 and provide the data to the application 150 via a trusted path, without having the SIM data encrypted.

The processes described above can be stored in the memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's).

In the foregoing specification, the invention has been described with reference to specific exemplary embodiments thereof. It will, however, be evident that various modifications and changes may be made thereto without departing from the broader spirit and scope of the invention as set forth in the appended claims. In particular, as described herein, the SIM device is inclusive of Smart card devices, including USB Chip/Smart Card Interface Devices (CCID. Furthermore, the architecture of the system as described herein is independent of any particular key exchange protocols that are used. The specification and drawings are, accordingly, to be regarded in an illustrative rather than a restrictive sense.

What is claimed is:

1. A method comprising:
   executing, by a hardware processor, a protected application in a protected execution environment that is provided by a trusted platform, the protected execution environment being associated with a protected section of memory that is inaccessible to direct memory access and an unprotected section of memory that is accessible to direct memory access, wherein the trusted platform includes a trusted path and an untrusted path;
   determining, by the hardware processor executing the protected application, that information is to be accessed from a subscriber identity module (SIM) device that includes a SIM card, the SIM device being physically connected with the trusted platform;
   wherein the trusted path is a path between the protected application and the SIM device, the trusted path being a path through a trusted port of the trusted platform, wherein the trusted port is mapped to the protected section of memory;
   wherein the untrusted path is another path between the protected application and the SIM device, the untrusted path being a path through an untrusted port of the trusted platform, wherein the untrusted port is mapped to the unprotected section of memory;
   exchanging unencrypted data that includes an encryption key between the SIM device and the protected application via the trusted path, wherein the unencrypted data to be exchanged is secured from unauthorized access via properties of the trusted port; and
   exchanging encrypted data that is additional data that has been encrypted using the encryption key between the SIM device and the protected application via the untrusted path.

2. The method of claim 1, wherein exchanging the encryption key includes the protected application transmitting the encryption key to the protected section of memory; and
   the SIM device accessing the encryption key from the protected section of memory.

3. The method of claim 1, wherein exchanging the encryption key includes the protected application accessing the encryption key from the SIM device, the protected application accessing the encryption key via the trusted port.

4. The method of claim 1, wherein exchanging the encryption key includes exchanging multiple encryption keys, and exchanging the encrypted data includes exchanging separate units of data, with each unit of data separately encrypted with an encryption key selected from the multiple encryption keys.

5. The method of claim 1, wherein exchanging the encrypted data includes a host controller transmitting data from the SIM device to the unprotected section of memory, and a driver transmitting data from the unprotected section of memory to the protected application.

6. The method of claim 5, wherein the host controller is a Universal Serial Bus (USB) host controller and the driver is a USB driver.

7. The method of claim 1, wherein exchanging the encryption key includes the SIM device reading the encryption key from the protected section of memory via the trusted port.

8. The method of claim 1 further comprising:
   the protected application decrypting the encrypted data using the encryption key.

9. The method of claim 1 further comprising:
   prior to exchanging the encryption key, the protected application authenticating the SIM device.

10. The method of claim 5, further comprising:
    exchanging a new encryption key based on a predetermined event selected from a group comprising of, each new transaction, passage of a predetermined period of time, and exchange of a predetermined amount of data.

11. A system comprising:
    a memory having a protected section that is inaccessible to direct memory access and an unprotected section that is accessible to direct memory access;
    a trusted platform to provide a protected execution environment, the protected execution environment being associated with the protected section of memory and the unprotected section of memory, wherein the trusted platform includes a trusted path and an untrusted path; and
    a hardware processor to execute a protected application in the protected execution environment, wherein the trusted application to:
        determine that information is to be accessed from a subscriber identity module (SIM) device that includes a SIM card, the SIM device being physically connected with the trusted port;

wherein the trusted path is a path between the protected application and the SIM device, the trusted path being a path through a trusted port of the trusted platform, wherein the trusted port is mapped to the protected section of memory;

wherein the untrusted path is another path between the protected application and the SIM device, the untrusted path being a path through an untrusted port of the trusted platform, wherein the untrusted port is mapped to the unprotected section of memory;

exchange, with the SIM device, unencrypted data that includes an encryption key via the trusted path, wherein the unencrypted data to be exchanged is secured from unauthorized access via properties of the trusted port; and exchange, with the SIM device, encrypted data that is additional data that has been encrypted using the encryption key via the untrusted path.

12. The system of claim 11, wherein the exchange of the encryption key includes the protected application to transmit the encryption key to the protected section of memory, and the SIM device to access the encryption key from the protected section of memory.

13. The system of claim 11, wherein the exchange of the encryption key includes the protected application to access the encryption key from the SIM device, the protected application to access the encryption key via the trusted port of the trusted platform.

14. The system of claim 11, wherein the exchange of the encryption key includes an exchange of multiple encryption keys, and the exchange of encrypted data includes an exchange of separate units of data, with each unit of data separately encrypted with an encryption key selected from the multiple encryption keys.

15. The system of claim 11, wherein the system further includes a host controller to transmit data from the SIM device to the unprotected section of memory.

16. The system of claim 15, wherein the system further includes a driver to transmit data from the unprotected section of memory to the protected application.

17. The system of claim 16, wherein the host controller is a Universal Serial Bus (USB) host controller and the driver is a USB driver.

18. The system of claim 11, wherein the SIM device is to read the encryption key from the protected section of memory via the trusted port of the trusted platform.

19. The system of claim 11, wherein the protected application is to decrypt the encrypted data using the encryption key.

20. The system of claim 11, wherein the protected application is to authenticate the SIM device prior to the exchange of the encryption key.

21. The system of claim 11, wherein a new encryption key is to be exchanged based on a predetermined event selected from a group comprising of, each new transaction, passage of a predetermined period of time, and exchange of a predetermined amount of data.

22. The method of claim 1, further comprising:
   determining, by the SIM device, that the protected application is executed in the trusted execution environment before exchanging the unencrypted data.

23. The method of claim 1, wherein the trusted path is not accessible to applications other than the protected application and the untrusted path is accessible to applications other than the protected application.

* * * * *